(12) United States Patent
Maeda

(10) Patent No.: US 8,947,675 B2
(45) Date of Patent: Feb. 3, 2015

(54) ASPHERIC SURFACE MEASURING METHOD, ASPHERIC SURFACE MEASURING APPARATUS, OPTICAL ELEMENT PRODUCING APPARATUS AND OPTICAL ELEMENT

(71) Applicant: Canon Kabushiki Kaisha, Tokyo (JP)

(72) Inventor: Yoshiki Maeda, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 146 days.

(21) Appl. No.: 13/789,921

(22) Filed: Mar. 8, 2013

(65) Prior Publication Data

US 2013/0235478 A1    Sep. 12, 2013

(30) Foreign Application Priority Data

Mar. 9, 2012  (JP) ................. 2012-052423

(51) Int. Cl.
*G01B 11/24* (2006.01)
*G02B 3/04* (2006.01)
*G01M 11/00* (2006.01)
*G01M 11/02* (2006.01)

(52) U.S. Cl.
CPC  *G01B 11/24* (2013.01); *G02B 3/04* (2013.01); *G01M 11/005* (2013.01); *G01M 11/0271* (2013.01)
USPC ........... 356/512; 356/513; 359/718; 359/729; 359/366

(58) Field of Classification Search
USPC .......... 356/601, 512, 513, 515; 359/718, 729, 359/731, 366; 250/492.2
See application file for complete search history.

(56) References Cited

U.S. PATENT DOCUMENTS

| | | | |
|---|---|---|---|
| 6,449,049 B1* | 9/2002 | Lam et al. | 356/515 |
| 7,106,455 B2* | 9/2006 | Suzuki et al. | 356/512 |
| 7,612,893 B2* | 11/2009 | Kuchel | 356/513 |
| 8,526,009 B2* | 9/2013 | Ueki | 356/512 |
| 2002/0056815 A1* | 5/2002 | Mann et al. | 250/492.2 |
| 2003/0103215 A1* | 6/2003 | Kuchel | 356/513 |
| 2003/0215053 A1* | 11/2003 | Ichihara | 378/36 |
| 2010/0110446 A1* | 5/2010 | Kuchel | 356/512 |
| 2010/0177322 A1* | 7/2010 | Nakauchi | 356/512 |
| 2013/0235472 A1 | 9/2013 | Furukawa | |
| 2013/0235477 A1 | 9/2013 | Furukawa | |

FOREIGN PATENT DOCUMENTS

JP  09-329427 A    12/1997
JP  2003-050109    2/2003

* cited by examiner

*Primary Examiner* — Sang Nguyen
(74) *Attorney, Agent, or Firm* — Rossi, Kimms & McDowell LLP

(57) ABSTRACT

The method for measuring profile of an aspheric surface projects an illumination light onto the aspheric surface and introduces a reflected light reflected by the aspheric surface to a sensor through an optical system. The method provides, to a wavefront of the illumination light, a curvature bringing an absolute value of an angle of the reflected light to a smaller value than a maximum value of absolute values of angles of optical system side peripheral rays, locates an exit pupil such that the absolute value of the reflected light angle is smaller than the maximum value, provides, to a sensor conjugate surface, a curvature and a position causing rays of the reflected light not to intersect on the sensor conjugate surface. The sensor conjugate surface, the wavefront of the illumination light and the aspheric surface have a same one of convex and concave surfaces toward a same direction.

7 Claims, 6 Drawing Sheets

ASPHERIC SURFACE MEASURING METHOD, ASPHERIC SURFACE MEASURING APPARATUS, OPTICAL ELEMENT PRODUCING APPARATUS AND OPTICAL ELEMENT

BACKGROUND OF THE INVENTION

1. Field of the Invention

The present invention relates to a technology for measuring aspheric surface profile of an optical element such as an aspheric lens.

2. Description of the Related Art

Measurement of aspheric surface profile of an optical element such as a lens or a mirror requires high accuracy and high throughput. Such high accuracy and high throughput measurement of the aspheric surface profile means measurement capable of simultaneously measuring the entire aspheric surface profile. Japanese Patent Laid-Open No. 09-329427 discloses, as a measuring apparatus capable of performing such aspheric surface profile measurement, an interferometer using a null lens. This interferometer is constituted by a Fizeau interferometer or the like provided with the null lens, and projects a reference light (illumination light) having a wavefront corresponding to designed profile of a measurement object aspheric surface. Moreover, the interferometer causes a detection light (reflected light) from the measurement object aspheric surface to interfere with the reference light, measures a difference between a wavefront of the detection light and the wavefront of the reference light and thereby calculates the aspheric surface profile of the measurement object aspheric surface.

Moreover, Japanese Patent Laid-Open No. 2003-050109 discloses, as an aspheric surface measuring apparatus using no null lens, a measuring apparatus using, as a light-receiving sensor, a Shack-Hartmann sensor whose dynamic range for wavefront measurement is wide. This measuring apparatus projects an illumination light that is a spherical wave onto a measurement object aspheric surface through an illumination optical system. Since the measurement object aspheric surface is an aspheric surface, the illumination light is not projected perpendicularly to the measurement object aspheric surface in a region where the measurement object aspheric surface exists, and therefore a ray angle of a detection light reflected by the measurement object aspheric surface is different from that of the illumination light projected onto the measurement object aspheric surface. Consequently, the reflected detection light entering the light-receiving sensor is not collimated, which has a wavefront significantly different from a planer wavefront. Thereby, detection of this wavefront enables calculation of profile of the measurement object aspheric surface.

However, use of the null lens requires production thereof with a lot of time and cost because measurement accuracy depends on production accuracy of the null lens. Moreover, use of the null lens requires provision of null lenses different for each measurement object aspheric surface profile.

On the other hand, when not using the null lens, curvature of the wavefront of the illumination light projected onto the measurement object aspheric surface does not coincide with that of the measurement object aspheric surface. In this case, reflected lights from different reflection points on the measurement object aspheric surface are focused at a same point on the light-receiving sensor, which makes it impossible to specify the reflection points on the measurement object aspheric surface from the reflected lights entering the light-receiving sensor. In addition, the reflected lights entering the light-receiving sensor have angles exceeding a maximum measurable angle of the sensor.

In order to avoid such problems, the measuring apparatus disclosed in Japanese Patent Laid-Open No. 2003-050109 moves the measurement object aspheric surface in an optical axis direction so as to make the curvature of the wavefront of the illumination light and the curvature of the measurement object aspheric surface close to each other. However, when measuring a measurement object aspheric surface whose curvature changes greatly in its radial direction, even though a curvature of the measurement object aspheric surface at a certain point coincides with the curvature of the wavefront of the illumination light, curvatures of the measurement object aspheric surface at other points significantly differ from the curvature of the wavefront of the illumination light. As a result, the above problems cannot be sufficiently solved.

SUMMARY OF THE INVENTION

The present invention provides an aspheric surface measuring method and an aspheric surface measuring apparatus, capable of simultaneously measuring, using a same optical system, profile of an entire aspheric surface whose curvature greatly changes in its radial direction and profile of each of a plurality of aspheric surfaces whose curvatures are mutually different.

The present invention provides as one aspect thereof an aspheric surface measuring method for measuring profile of a measurement object aspheric surface using output from a light-receiving sensor, by projecting light from a light source as an illumination light that is a spherical wave onto the measurement object aspheric surface through an illumination optical system and introducing a reflected light that is the light reflected by the measurement object aspheric surface to the light-receiving sensor through an imaging optical system. The method includes: providing, to a wavefront of the illumination light, a curvature that brings an absolute value of an angle of the reflected light to a smaller value than a maximum value of absolute values of angles of peripheral rays on a side closer to the measurement object aspheric surface than the imaging optical system; locating an exit pupil of the imaging optical system when defining the light-receiving sensor as an object surface at a position where the absolute value of the angle of the reflected light is smaller than the maximum value; providing, to a sensor conjugate surface having a conjugate relationship with the light-receiving sensor provided by the optical system, a curvature and a position that cause rays of the reflected light not to intersect with one another; and setting all of the sensor conjugate surface, the wavefront of the illumination light and the measurement object aspheric surface to have a same one of convex and concave surfaces toward a same side in an optical axis direction of the illumination and imaging optical systems.

The present invention provides as another aspect thereof an aspheric surface measuring apparatus configured to measure profile of a measurement object aspheric surface. The apparatus includes a light-receiving sensor, an illumination optical system configured to project light from a light source as an illumination light that is a spherical wave onto the measurement object aspheric surface, and an imaging optical system configured to introduce a reflected light that is the light reflected by the measurement object aspheric surface to the light-receiving sensor. The apparatus is configured to: provide, to a wavefront of the illumination light, a curvature that brings an absolute value of an angle of the reflected light to a smaller value than a maximum value of absolute values of angles of peripheral rays on a side closer to the measurement object aspheric surface than the imaging optical system; locate an exit pupil of the imaging optical system when defining the light-receiving sensor as an object surface at a position where the absolute value of the angle of the reflected light is smaller than the maximum value; and provide, to a sensor conjugate surface having a conjugate relationship with the light-receiving sensor provided by the optical system, a curvature and a position that cause rays of the reflected light not to intersect with one another. All of the sensor conjugate surface, the wavefront of the illumination light and the measurement object aspheric surface are set to have a same one of convex and concave surfaces toward a same side in an optical axis direction of the illumination and imaging optical systems.

The present invention provides as further another aspect thereof an optical element producing apparatus includes a shaping apparatus configured to shape an optical element, and the above-described measuring apparatus.

The present invention provides as yet further another aspect thereof an optical element produced by using the above optical element producing apparatus.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
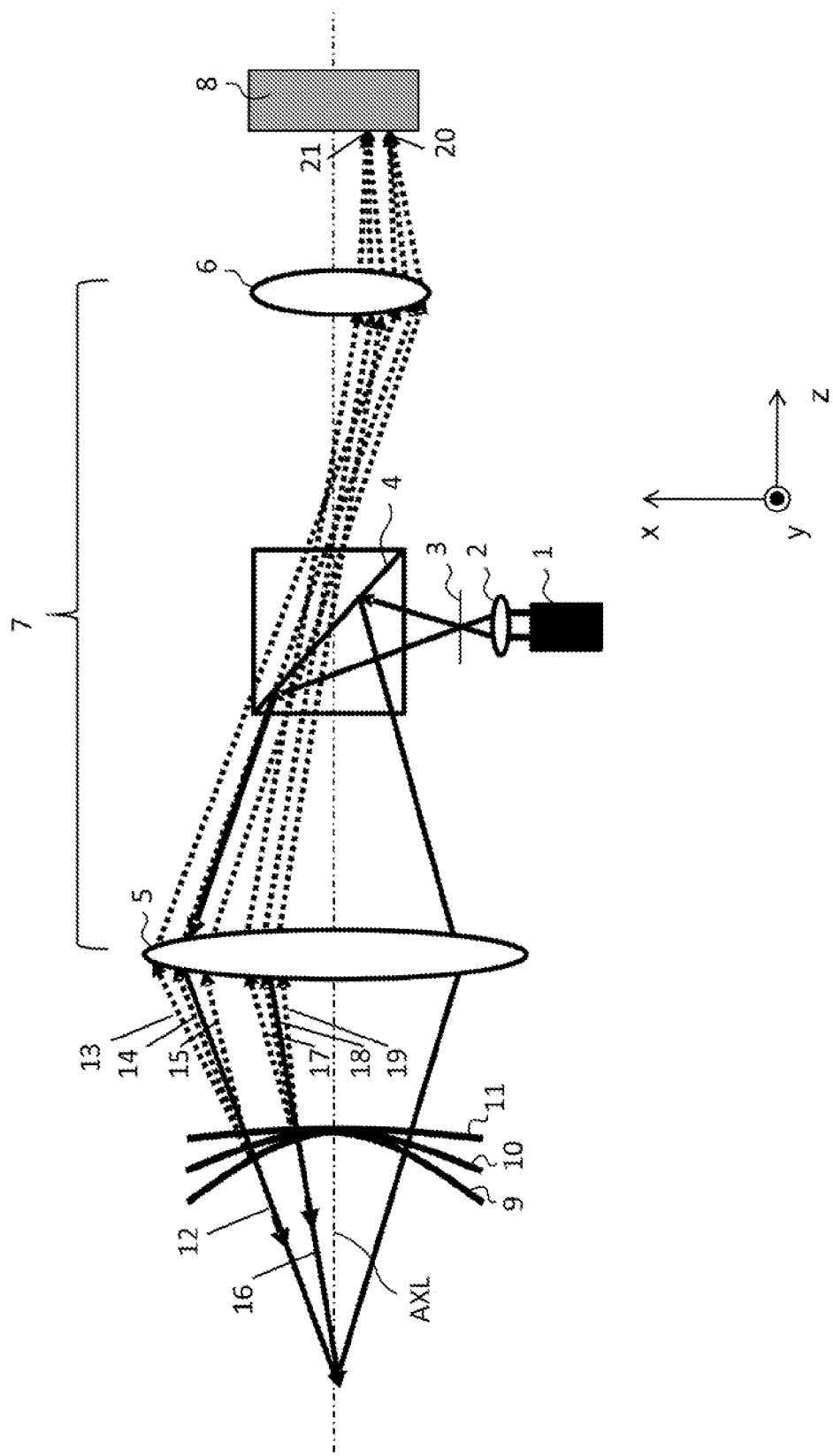
FIG. 1 shows a configuration of an aspheric surface measuring apparatus that is Embodiment 1 of the present invention.

FIG. 1 shows a configuration of an aspheric surface measuring apparatus that performs measurement by an aspheric surface measuring method that is a first embodiment (Embodiment 1) of the present invention. In the following description, definitions of symbols and positions of constituent elements in an optical system are described by using an xyz orthogonal coordinate system shown in FIG. 1. A z-axis corresponds to an optical axis of the optical system, which is hereinafter referred to as "an optical axis AXL". A direction in which the optical axis AXL extends is referred to as "an optical axis direction".

Light from a light source 1 is condensed by a condenser lens 2 toward a pinhole 3, and passes therethrough to reach a half mirror 4. The light reflected by the half mirror 4 passes through an illumination optical system 5 and thereby exits therefrom as an illumination light 12 that is a spherical wave having a negative curvature. The illumination light 12 is projected onto measurement object aspheric surfaces 9, 10 and 11 that are aspheric surfaces having various curvatures and are convex surfaces. The measurement object aspheric surface is a surface whose aspheric profile is to be measured. Although FIG. 1 collectively shows the measurement object aspheric surfaces 9, 10 and 11, only one thereof is placed in the measuring apparatus in actual measurement. The measurement object aspheric surfaces 9, 10 and 11 are placed such that their apexes are located at a same point on the optical axis AXL. Moreover, although FIG. 1 shows the illumination optical system 5 as one lens, an actual illumination optical system is constituted of a plurality of optical elements such as lenses. This also applies to a projection optical system 6 described later.

In FIG. 1, a dotted line 13 denotes a ray of the illumination light 12, which reaches the measurement object aspheric surface 9 at a certain incident angle and is reflected by the measurement object aspheric surface 9. A dotted line 14 denotes another ray of the illumination light 12, which reaches the measurement object aspheric surface 10 at the above-mentioned incident angle and is reflected by the measurement object aspheric surface 10. A dotted line 15 denotes still another ray of the illumination light 12, which reaches the measurement object aspheric surface 11 at the above-mentioned incident angle and is reflected by the measurement object aspheric surface 11. Moreover, dotted lines 17, 18 and 19 show rays of an illumination light 16 reaching the measurement object aspheric surfaces 9, 10 and 11 at an incident angle different from that of the rays of the illumination light 12 and respectively reflected by the measurement object aspheric surfaces 9, 10 and 11.

The reflected light (rays 13 to 15 and 17 to 19) from the measurement object aspheric surface (9, 10 and 11) passes through the illumination optical system 5, transmitted through the half mirror 4 and then enters the projection optical system 6. The reflected light is focused by the projection optical system 6 to enter a light-receiving sensor 8. This embodiment uses a Shack-Hartmann sensor as the light-receiving sensor 8. The Shack-Hartmann sensor is a light-receiving sensor that divides a wavefront of entering light by two-dimensionally arranged microlenses (microlens array) and projects the divided wavefronts to an image sensor such as a CCD sensor, thereby being capable of measuring the wavefront. Other sensors than the Shack-Hartmann sensor may be used which are capable of measuring wavefronts, such as a Talbot interferometer and a Shearing interferometer.

Next, description will be made of a condition for measuring the wavefront by the sensor 8 without overlap of the rays reflected by the measurement object aspheric surface on the sensor 8.

The light reflected by the measurement object aspheric surface passes through an imaging optical system 7 constituted of the illumination optical system 5 and the projection optical system 6 to enter the sensor 8 as described above. The sensor 8 is placed at an object surface of the imaging optical system 7. This embodiment forms a conjugate surface having a conjugate relationship with the sensor 8 provided by the imaging optical system 7 at a position closer to the measurement object aspheric surface than an intersection point where rays reflected at two different points on the measurement object aspheric surface intersect with each other. The conjugate surface is hereinafter referred to as "a sensor conjugate surface". This configuration makes it possible to form, on the sensor 8, an image of a wavefront in which rays do not overlap one another. For example, in this embodiment, forming the sensor conjugate surface at a same position as that of the measurement object aspheric surface on the optical axis AXL provides a one-to-one positional relationship to the sensor 8 and the measurement object aspheric surface, which enables detection of the rays reflected by the measurement object aspheric surface without overlap of the rays. Thus, this embodiment provides, to the imaging optical system 7, a Petzval sum of negative sign, and places the measurement object aspheric surface at the position of the sensor conjugate surface on the optical axis AXL.

In this embodiment, "to form the sensor conjugate surface at the same position as that of the measurement object aspheric surface on the optical axis AXL" and "to place the measurement object aspheric surface at the position of the sensor conjugate surface on the optical axis AXL" mean not only to bring their positions into perfect coincidence, but also to bring their positions into coincidence that can be regarded as coinciding optically (or in wavefront measurement). Moreover, the sensor conjugate surface has a curvature caused by field curvature.

Next, description will be made of conditions for avoiding vignetting of the reflected light reflected by the measurement object aspheric surface in the imaging optical system 7. One of the conditions is that angles of the rays (reflected light) reflected by the measurement object aspheric surface fall within, on the sensor conjugate surface, an angle between a ray (upper peripheral ray) passing through an upper peripheral portion of the imaging optical system 7 and a ray (lower peripheral ray) passing through a lower peripheral portion thereof. In order to satisfy this condition, the imaging optical system 7 forms its exit pupil, when the sensor 8 is defined as the object surface, at a focused point of the illumination light (spherical wave).

In this embodiment, "to form the exit pupil at the focused point of the illumination light" means not only to bring their positions into perfect coincidence, but also to bring their positions into coincidence (near coincidence) that can be regarded as coinciding optically (or in wavefront measurement).

In addition, as understood from explanation of an expression (8) described later, another one of the conditions is that it is necessary to set all of the sensor conjugate surface, the wavefront of the illumination light (hereinafter referred to as "an illumination wavefront") and the measurement object aspheric surface to have convex surfaces (that is, to set them to have a same one of convex and concave surfaces) toward a same side in the optical axis direction (that is, toward a +z direction shown in FIG. 1). In other words, it is necessary that all of signs of the curvature of the sensor conjugate surface, the curvature of the illumination wavefront and the curvature of the measurement object aspheric surface coincide with one another. If the measurement object aspheric surface is a concave surface, it is necessary to set all of the sensor conjugate surface, the illumination wavefront and the measurement object aspheric surface to have a concave surface toward a same side in the optical axis direction (that is, toward a -z direction).

Satisfaction of these conditions causes the reflected rays (reflected light) 13, 14 and 15 to be focused toward a point 20 on the sensor 8 and causes the reflected rays (reflected light) 17, 18 and 19 to be focused toward another point 21 on the sensor 8. Thus, this embodiment makes it possible to detect (measure) the rays reflected by the same measurement object aspheric surface without causing overlap of the rays on the sensor 8.

Moreover, in the imaging optical system 7, a maximum object height when the sensor 8 is defined as the object surface is equal to or smaller than size of the sensor 8. Therefore, a magnification of the imaging optical system 7 is higher than a value obtained by dividing an area to be measured on the measurement object aspheric surface by the maximum object height.

In addition, change of an angle of a sensor side principal ray in the imaging optical system 7 changes angles of the peripheral rays entering the sensor 8. Thus, the angle of the sensor side principal ray in the imaging optical system 7 is set such that the angles of the peripheral rays entering the sensor 8 do not exceed a maximum measurable angle of the sensor 8.

Use of such an imaging optical system 7 avoids rays, which respectively reaches, as the illumination lights 12 and 16, different two points on each of the measurement object aspheric surfaces 9, 10 and 11 having various curvatures and reflected at the two points, from being focused to a same point on the sensor 8. In other words, it is possible to simultaneously measure a wavefront of the reflected light simultaneously from the entire measurement object aspheric surface, that is, profile of the entire measurement object aspheric surface even when the curvature of the measurement object aspheric surface greatly changes in its radial direction. Furthermore, the angles of the rays entering the sensor 8 do not exceed the maximum measurable angle of the sensor 8.

Next, description will be made of, in the measuring apparatus of this embodiment thus configured, a relationship between the profile of the measurement object aspheric surface and parameters (designed values) of the imaging optical system 7 with reference to FIGS. 2 and 3.

Figure 2:
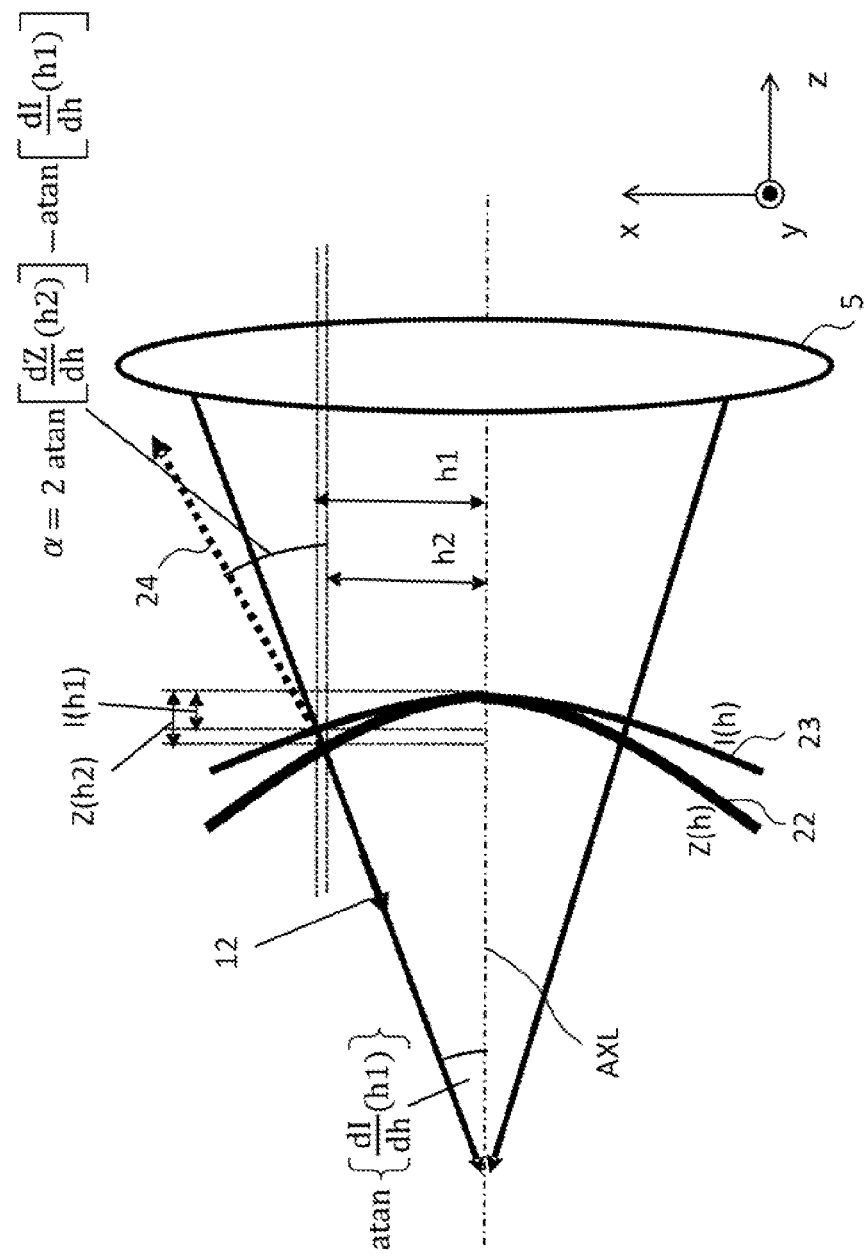
FIG. 2 shows an angle of a reflected light when an illumination light is projected onto a measurement object aspheric surface in the measuring apparatus of Embodiment 1.

FIG. 2 shows a measurement object aspheric surface 22 expressed by the following expression (1) and a wave front (illumination wavefront) 23 of the illumination light 12, expressed by the following expression (2). The illumination wavefront 23 has a spherical surface whose apex coincides with that of the measurement object aspheric surface 22 on the optical axis AXL.

$$Z(h) = \frac{h^2}{r_0 \left(1 + \sqrt{1 - \frac{(1+K)h^2}{r_0^2}}\right)} + A1h + A2h^2 + A3h^3 + A4h^4 + A5h^5 + A6h^6 + \cdots \quad (1)$$

$$I(h) = \sqrt{Ri^2 - h^2} + Ri \quad (2)$$

In the expressions (1) and (2), h is expressed by the following expression (3):

$$h^2 = x^2 + y^2 \quad (3)$$

In the expression (3), x and y respectively represent an x coordinate and a y coordinate of a point on the measurement object aspheric surface 22 or the illumination wavefront 23 when a position of the optical axis AXL in an xy plane is defined as an origin. In the expression (1), Z(h) represents a sag amount of the measurement object aspheric surface 22 from the xy plane, that is, a distance from the xy plane to the measurement object aspheric surface 22 when the apex of the measurement object aspheric surface 22 is in contact with the xy plane. Moreover, r0 represents a curvature radius of the measurement object aspheric surface 22 at its apex, K represents a conic constant, and An represents a coefficient of an n-th order h. The sag amount Z(h) shows a designed aspheric profile, and an aspheric profile as a measurement object has the coefficient An different according to shaping error. Furthermore, I(h) represents a sag amount of the illumination wavefront 23 from the xy plane, and Ri represents a curvature radius of the illumination wavefront 23.

Among rays of the illumination light 12 forming the illumination wavefront 23, one ray is hereinafter referred to as "an illumination ray". When h1 represents a distance of the illumination ray from the optical axis AXL and h2 represents a distance of an intersection point (ray position) of the illumination ray and the measurement object aspheric surface 22 from the optical axis AXL, an incident angle of the illumination ray to the measurement object aspheric surface 22 is provided, as follows, by substituting h1 into a function obtained by differentiating the illumination wavefront and calculating arctangent of the differentiated wavefront.

$$a \tan [dI/dh(h1)]$$

An angle α of a reflected ray 24, which is the illumination ray 24 after reflection by the measurement object aspheric surface 22, with respect to the optical axis AXL is expressed by the following expression (4), using a tan [dZ/dh(h2)] that is an angle of a normal to the measurement object aspheric surface 22 with respect to the optical axis AXL:

$$\alpha = 2\mathrm{atan}\left[\frac{dZ}{dh}(h2)\right] - \mathrm{atan}\left[\frac{dI}{dh}(h1)\right] \quad (4)$$

Figure 3:
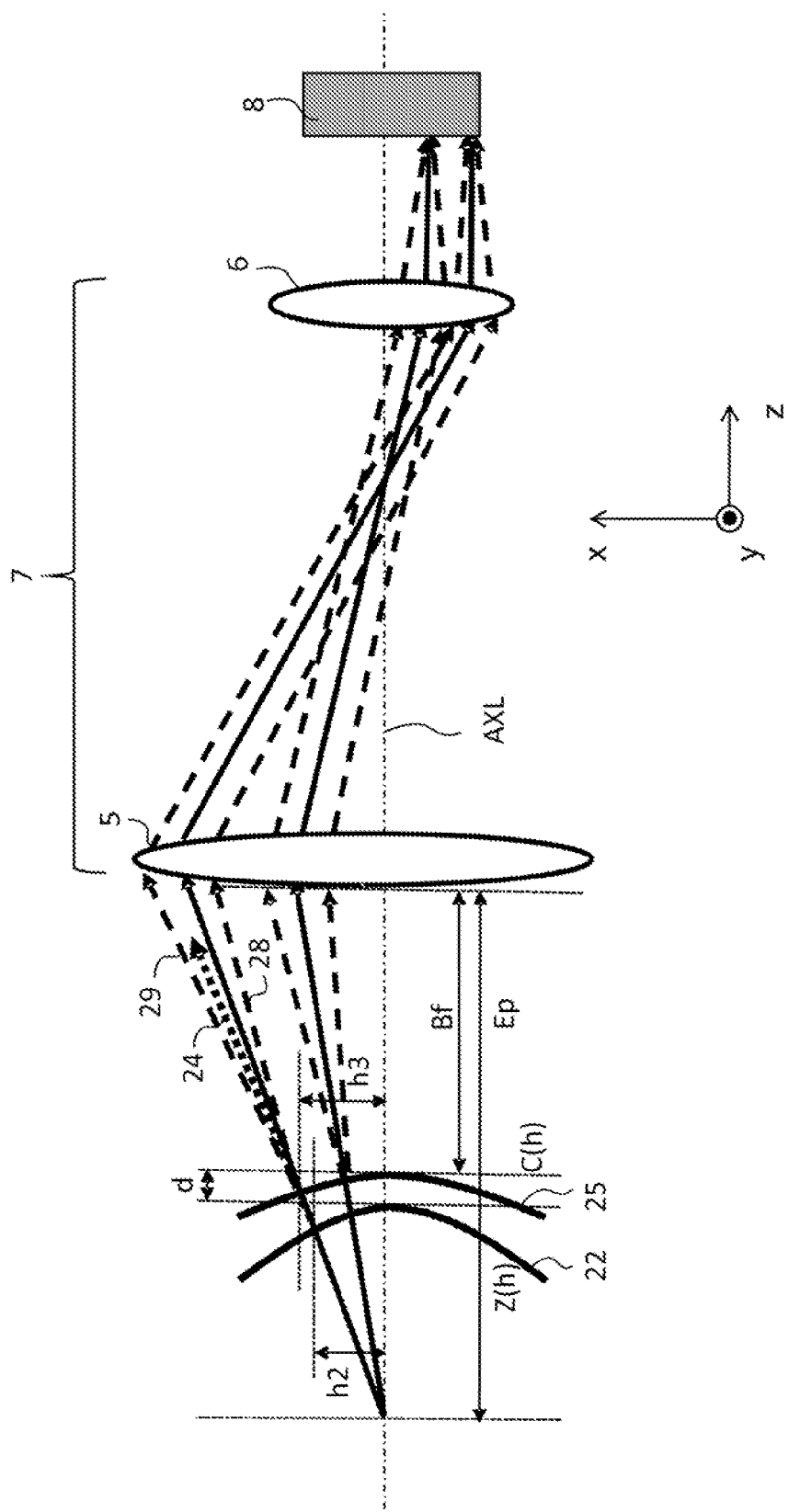
FIG. 3 shows a relationship of an imaging optical system and the reflected light from the measurement object aspheric surface in the measuring apparatus of Embodiment 1.

FIG. 3 shows a sensor conjugate surface 25 and the measurement object aspheric surface 22 in the imaging optical system 7 constituted as a pupil imaging lens. In FIG. 3, d represents a distance between the measurement object aspheric surface 22 and the sensor conjugate surface 25 on the optical axis AXL; the distance d in this embodiment is equal to 0. Moreover, a sag amount C(h) of the sensor conjugate surface 25 from the xy plane is expressed by the following expression (5), using a curvature radius Rc of the sensor conjugate surface 25:

$$C(h) = \sqrt{Rc^2 - h^2} + Rc \quad (5)$$

Description will here be made of a condition that the curvature radius Rc of the sensor conjugate surface 25 should satisfy in order to avoid the overlap of rays on the sensor 8. First, description will made of calculation of an intersection point of the reflected ray 24 and the sensor conjugate surface 25. A distance A(h) of the reflected ray 24 from a point on the xy plane is expressed by the following expression (6), using h2, Z(h2) and the angle α of the reflected ray 24 shown by the above expression (4):

$$A(h) = \frac{h}{\tan\left\{2\mathrm{atan}\left[\frac{dZ}{dh}(h2)\right] - \mathrm{atan}\left[\frac{dI}{dh}(h1)\right]\right\}} + Z(h2) + \frac{h2}{\tan\left\{2\mathrm{atan}\left[\frac{dZ}{dh}(h2)\right] - \mathrm{atan}\left[\frac{dI}{dh}(h1)\right]\right\}} \quad (6)$$

Thus, the intersection point (ray position) h3 of the reflected ray 24 and the sensor conjugate surface 25 is calculated by the following expression (7) that solves C(h3)=A(h3) for h3.

$$h3(h2) = \frac{1}{(\alpha^2+1)}\left[-\alpha(Rc-\beta) - \alpha\sqrt{Rc^2 - \alpha^2\beta^2 + 2Rc\alpha^2\beta}\right] \quad (7)$$

$$\alpha = \tan\left\{2\mathrm{atan}\left[\frac{dZ}{dh}(h2)\right] - \mathrm{atan}\left[\frac{dI}{dh}(h1)\right]\right\}$$

$$\beta = Z(h2) + \frac{h2}{\alpha}$$

The expression (7) shows a function of h2. The condition for avoiding the overlap of rays on the sensor 8 is, as mentioned above, that the rays reflected by the measurement object aspheric surface do not overlap one another on the sensor conjugate surface 25, in other words, the sensor conjugate surface 25 has a curvature and a position that cause the reflected rays not to intersect with one another on the sensor conjugate surface 25. This condition corresponds to that, when h2 is changed from 0 to an effective ray diameter, a value obtained by differentiating the expression (7) with respect to h2 is always positive. That is, deciding Rc such that a condition shown by the following expression (8) is satisfied results in avoidance of the overlap of the reflected rays on the sensor 8.

$$\frac{dh3(h2)}{dh2} > 0 \quad (8)$$

Next, description will be made of a condition for measurement of the reflected ray 24 traveling from the point h2 on the measurement object aspheric surface 22 through the imaging optical system 7 to the sensor 8 with reference to FIG. 3.

In FIG. 3, Bf represents a distance between a final (most measurement object aspheric surface side or sensor conjugate surface side) lens surface of the imaging optical system 7 and the sensor conjugate surface 25 on the optical axis AXL, Ep represents a distance between the final lens surface of the imaging optical system 7 and the exit pupil on the optical axis AXL when the sensor 8 is defined as the object surface. Moreover, NAo represents a sensor side numerical aperture of the imaging optical system 7, and NAi represents a sensor conjugate surface side numerical aperture of the imaging optical system 7. In addition, M represents a magnification of the imaging optical system 7 when the sensor 8 is defined as the object surface.

Figure 4:
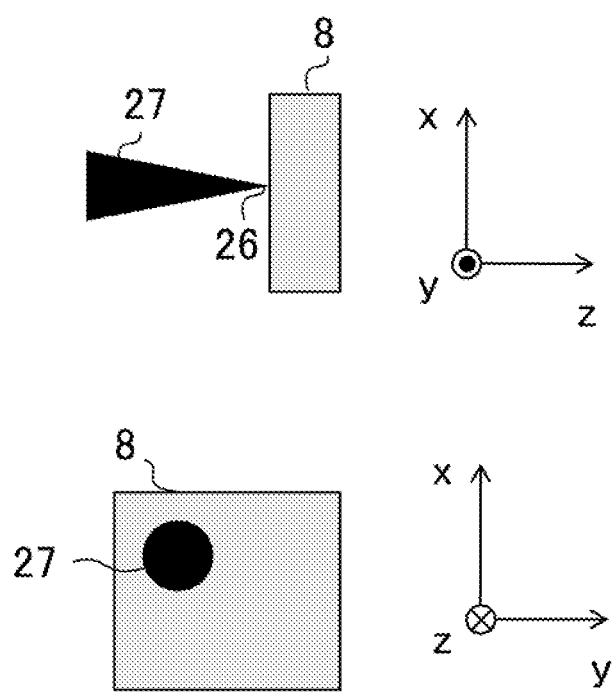
FIG. 4 shows trajectories of rays measurable by a sensor in the measuring apparatus of Embodiment 1.

First, description will be made of a condition relating to the sensor side principal ray and the sensor side numerical aperture NAo of the imaging optical system 7. As shown in FIG. 4, trajectories 27 of rays measurable at a point 26 on the sensor 8 are distributed in a circular cone whose apex is located at the point 26 on the sensor 8, whose bottom is parallel to the xy plane, and whose height direction is parallel to the optical axis AXL. Thus, the imaging optical system 7 is configured such that a position of its entrance pupil is located at an infinite point and a maximum angle of the peripheral ray coincides with the maximum measurable angle of the sensor 8. In other words, the imaging optical system 7 is configured to make the sensor side principal ray telecentric and to set the sensor side numerical aperture NAo to a sine value of the maximum measurable angle of the sensor 8. The imaging optical system 7 thus configured is an optical system capable of introducing all of rays passing through its pupil to the sensor 8 as measurable rays, that is, an optical system adapted to a dynamic range of the sensor 8.

Next, description will be made of a condition relating to the exit pupil and a back focus of the imaging optical system 7, and the sensor conjugate surface with reference to FIG. 3. In the imaging optical system 7, of the peripheral rays at a height of h3 from the optical axis AXL, a −x side (optical axis side) peripheral ray 28 closer to the optical axis AXL than a principal ray shown by a solid line has, with respect to the optical axis AXL, a tilt angle corresponding to an angle calculated by subtracting an arcsine value of the sensor conjugate surface side numerical aperture (that is, a numerical aperture of the sensor conjugate surface 25) NAi from an absolute value of an angle of that principal ray with respect to the optical axis AXL. That is, the tilt angle of the −x side peripheral ray 28 is expressed by the following expression (9):

$$\left|\operatorname{atan}\left(\frac{h3}{Ep - Bf - C(h3)}\right)\right| - a\sin(NAi) \qquad (9)$$

Moreover, a +x side (opposite-to-optical axis side) peripheral ray 29 farther from the optical axis AXL than the above principal ray has, with respect to the optical axis AXL, a tilt angle corresponding to an angle calculated by adding the arcsine value of the numerical aperture of the sensor conjugate surface 25 to the absolute value of the angle of that principal ray with respect to the optical axis AXL. That is, the tilt angle of the +x side peripheral ray 29 is expressed by the following expression (10):

$$\left|\operatorname{atan}\left(\frac{h3}{Ep - Bf - C(h3)}\right)\right| + a\sin(NAi) \qquad (10)$$

The condition for the measurement of the reflected ray 24 from the point h2 on the measurement object aspheric surface 22 by the sensor 8 is that: it is necessary that the absolute value of the tilt angle of the reflected ray 24 with respect to the optical axis AXL, which has been shown by the expression (4), is greater than the absolute value of the tilt angle of the −x side peripheral ray 28 with respect to the optical axis AXL, which has been shown by the expression (9); and it is necessary that the absolute value of the tilt angle of the reflected ray 24 shown by the expression (4) is smaller than the (maximum) absolute value of the tilt angle of the +x side peripheral ray 29 shown by the expression (10). That is, the condition for the measurement of the reflected ray 24 by the sensor 8 is to set the curvature of the illumination wavefront 23 and the position of the exit pupil of the imaging optical system 7 so as to satisfy the following conditional expression (11):

$$\left|\operatorname{atan}\left(\frac{h3}{Ep - Bf - C(h3)}\right)\right| - a\sin(NAi) < \qquad (11)$$
$$\left|2\operatorname{atan}\left[\frac{dZ}{dh}(h2)\right] - \operatorname{atan}\left[\frac{dI}{dn}(h1)\right]\right| <$$
$$\left|\operatorname{atan}\left(\frac{h3}{Ep - Bf - C(h3)}\right)\right| + a\sin(NAi)$$

This embodiment approximately defines the numerical aperture NAi of the sensor conjugate surface 25 as follows using the sensor side numerical aperture NAo and the magnification M of the imaging optical system 7:

$NAi = \sin[a\sin(NAo)/M]$.

Substituting the numerical aperture NAi into the expression (11) provides the following expression (12). The expression (12) includes therein a sin(NAo) that is the maximum measurable angle of the sensor 8, which makes it possible to easily calculate the condition for the optical system.

$$\left|\operatorname{atan}\left(\frac{h3}{Ep - Bf - C(h3)}\right)\right| - \frac{a\sin(NAo)}{M} < \qquad (12)$$
$$\left|2\operatorname{atan}\left[\frac{dZ}{dh}(h2)\right] - \operatorname{atan}\left[\frac{dI}{dh}(h1)\right]\right| <$$
$$\left|\operatorname{atan}\left(\frac{h3}{Ep - Bf - C(h3)}\right)\right| + \frac{a\sin(NAo)}{M}$$

As a condition in order to enable the measurement of the reflected light from the aspheric surface shown by the expression (1), it is necessary that the expression (11) or (12) holds for all values of h2 from 0 to the ray effective diameter. Thus, a condition that the optical system has to satisfy can be calculated by using the expressions (8) and (11) or the expressions (9) and (12). Conversely, deciding the condition for the optical system makes it possible to calculate a measurable profile of the measurement object aspheric surface by using the expressions (8) and (11) or the expressions (9) and (12).

Next, description will be made of a specific embodiment (numerical embodiment) showing a condition for the imaging optical system 7 (illumination and projection optical systems 5 and 6) that can measure a measurement object aspheric surface given by aspheric coefficients shown in Table 1; the condition is a result of calculation using the expressions (8) and (12). The aspheric coefficients shown in Table 1 are defined by the expression (1). "E-X" denotes "×10$^{-X}$".

TABLE 1

| | |
|---|---|
| r0 | −300 |
| K | −1 |
| A4 | 1.000000E−07 |
| A6 | 3.500000E−11 |
| A8 | 3.000000E−15 |
| EFFECTIVE DIAMETER [mm] | 80 |

First, decision of specifications of the sensor 8 decides part of the condition for the optical system. This numerical embodiment uses, as the sensor 8, a Shack-Hartmann sensor having specifications in which its light-receiving surface (CCD surface) has a size of 30 mm×30 mm and a maximum measurable angle is 10°. Therefore, the object surface of the imaging optical system 7 is the light-receiving surface (CCD surface) of the Shack-Hartmann sensor, and the sensor side numerical aperture NAo is sin 10°. Moreover, the imaging optical system 7 needs a magnification M of 2.7 or more; 2.7 is the result of division of 80 mm by 30 mm. Thus, this numerical embodiment sets the magnification M to 4.

Furthermore, this numerical embodiment sets the back focus Bf of the imaging optical system 7 to −100 mm in order to secure a space where the measurement object aspheric surface is placed. In the measurement, the apex of the measurement object aspheric surface is coincided with the sensor conjugate surface 25 on the optical axis AXL.

From the above specifications and settings, conditions required from restrictions of the measuring apparatus are decided. Next, under these conditions, the curvature radius Ri of the illumination wavefront 23, the curvature radius Rc of the sensor conjugate surface 25 and the position of the exit pupil of the imaging optical system 7 (that is, the distance between the final lens surface of the imaging optical system 7 and the exit pupil on the optical axis AXL) Ep are decided by using the expression (12).

First, the curvature radius Ri of the illumination wavefront 23 is changed to −300 mm, −350 mm and −400 mm. Then, for these curvature radii Ri, the position Ep of the exit pupil is calculated when h1 is changed from 5 mm to 40 mm at intervals of 5 mm and the curvature radius Rc of the sensor conjugate surface 25 is changed to −300 mm, −400 mm and −500 mm.

Table 2 shows the calculation results.

TABLE 2

| | | Rc | | | | | |
|---|---|---|---|---|---|---|---|
| | | −300 | | −400 | | −500 | |
| | | Ep_min | Ep_max | Ep_min | Ep_max | Ep_min | Ep_max |
| Ri = −300 | | | | | | | |
| h1 | 5 | 84.6 | −183.0 | 84.6 | −183.0 | 84.6 | −183.0 |
| | 10 | 794.8 | −231.3 | 795.0 | −231.3 | 795.1 | −231.3 |
| | 15 | −4728.1 | −265.6 | −4729.3 | −265.6 | −4730.1 | −265.6 |
| | 20 | −1433.1 | −295.5 | −1433.6 | −295.4 | −1433.9 | −295.4 |
| | 25 | −1216.0 | −328.0 | −1216.5 | −327.9 | −1216.8 | −327.8 |
| | 30 | −1408.9 | −372.5 | −1409.6 | −372.3 | −1410.1 | −372.2 |
| | 35 | −2815.3 | −450.0 | −2817.0 | −449.7 | −2818.1 | −449.6 |
| | 40 | 2988.1 | −638.7 | 2990.3 | −638.3 | 2991.7 | −638.1 |
| Ri = −350 | | | | | | | |
| h1 | 5 | 102.4 | −179.8 | 102.5 | −179.8 | 102.5 | −179.8 |
| | 10 | 1461.5 | −223.6 | 1461.7 | −223.5 | 1461.9 | −223.5 |
| | 15 | −1542.0 | −253.5 | −1542.4 | −253.4 | −1542.6 | −253.4 |
| | 20 | −914.3 | −278.8 | −914.6 | −278.7 | −914.8 | −278.7 |
| | 25 | −827.6 | −305.5 | −827.9 | −305.4 | −828.1 | −305.4 |
| | 30 | −904.8 | −341.0 | −905.3 | −340.9 | −905.5 | −340.8 |
| | 35 | −1281.8 | −400.0 | −1282.6 | −399.8 | −1283.1 | −399.7 |
| | 40 | −6682.2 | −529.7 | −6687.0 | −529.4 | −6689.9 | −529.2 |
| Ri = −400 | | | | | | | |
| h1 | 5 | 118.2 | −177.6 | 118.3 | −177.6 | 118.3 | −177.6 |
| | 10 | 3435.2 | −218.3 | 3435.8 | −218.3 | 3436.2 | −218.3 |
| | 15 | −1051.4 | −245.5 | −1051.6 | −245.4 | −1051.8 | −245.4 |
| | 20 | −730.6 | −268.0 | −730.8 | −267.9 | −731.0 | −267.9 |
| | 25 | −677.3 | −291.4 | −677.5 | −291.3 | −677.7 | −291.2 |
| | 30 | −724.9 | −321.8 | −725.2 | −321.7 | −725.4 | −321.6 |
| | 35 | −931.0 | −370.9 | −931.5 | −370.7 | −931.9 | −370.6 |
| | 40 | −2069.9 | −473.0 | −2071.3 | −472.7 | −2072.2 | −472.5 |

As understood from the results shown in Table 2, the measurement of the measurement object aspheric surface having the aspheric coefficients shown in Table 1 needs an optical system produced (designed) as below. For example, the position Ep of the exit pupil is decided such that, when the curvature radius Ri of the illumination wavefront 23 is −350 mm and the curvature radius Rc of the sensor conjugate surface 25 is −500 mm, the position Ep falls within a range from −828.1 mm to −529.2 mm.

Then, this numerical embodiment produces the optical system under a condition that a wavelength of the light source 1 is 632.8 nm, the curvature radius Ri of the illumination wavefront 23 is −350 mm, the curvature radius Rc of the sensor conjugate surface 25 is −500 mm, the position Ep of the exit pupil is −600 mm.

According to calculation of the ray position h3 on the sensor conjugate surface 25 in the optical system under the above condition, increase of h2 increases h3. Therefore, setting the curvature radius Rc of the sensor conjugate surface 25 to −500 mm satisfies the condition showing the expression (8), which enables the measurement of the wavefront of the reflected light from the measurement object aspheric surface without the overlap of the reflected rays on the sensor 8.

Figure 5:
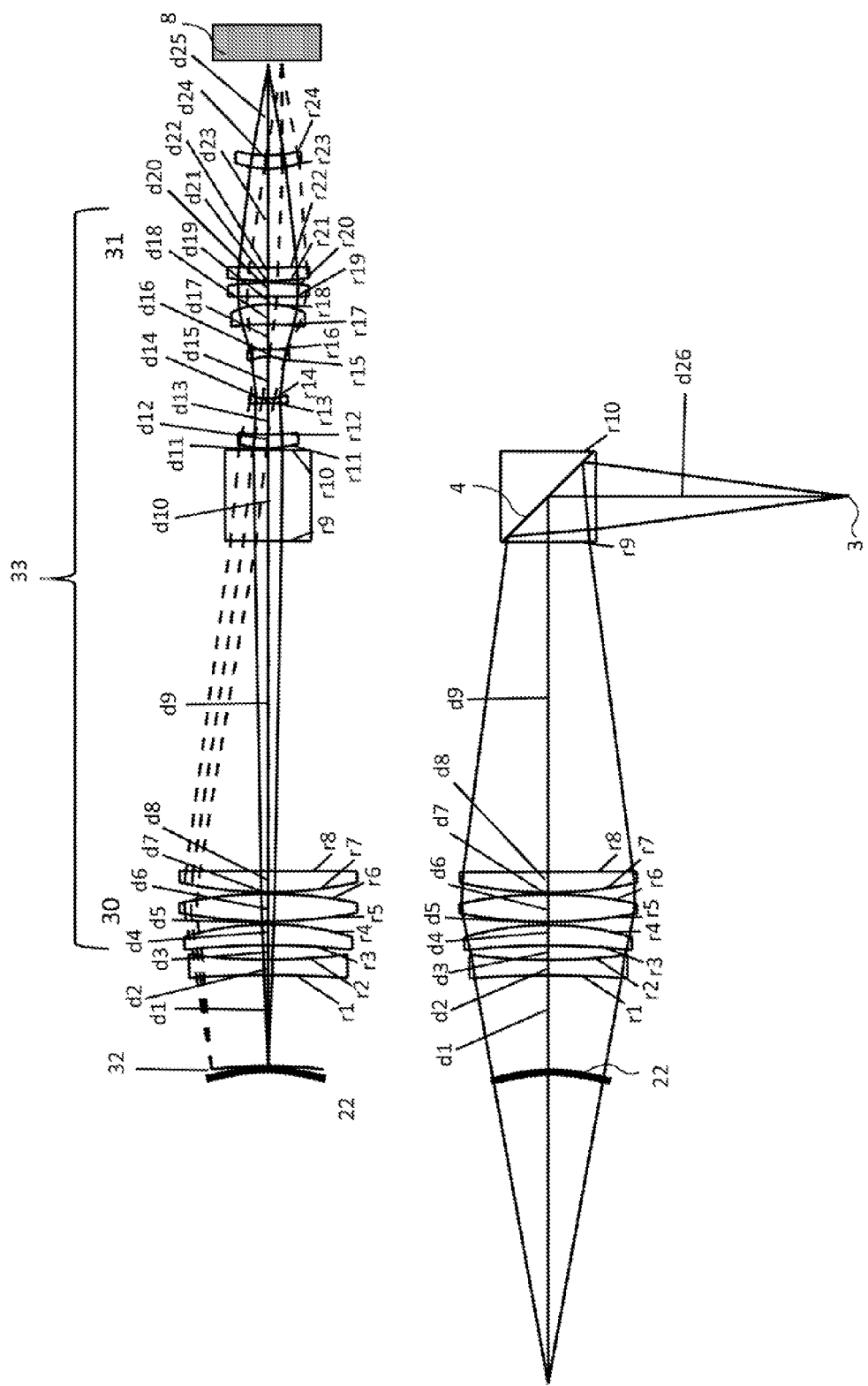
FIG. 5 is a side view and a top view showing a configuration of a numerical embodiment of the present invention.

Table 3 shows parameters of the optical system according to the above-mentioned condition, and FIG. 5 shows a configuration of the measuring apparatus according thereto.

TABLE 3

| LENS SURFACE CURVATURE RADIUS [mm] | | LENS SURFACE DISTANCE [mm] | | REFRACTIVE INDEX |
|---|---|---|---|---|
| SENSOR CONJUGATE SURFACE | −500.000 | d1 | 100.000 | |
| r1 | −1122.071 | d2 | 17.000 | n1 1.514621 |
| r2 | 648.604 | d3 | 15.834 | |
| r3 | −866.690 | d4 | 23.000 | n2 1.514621 |
| r4 | −307.148 | d5 | 3.501 | |
| r5 | 520.681 | d6 | 30.000 | n3 1.514621 |
| r6 | −468.085 | d7 | 2.000 | |
| r7 | 429.008 | d8 | 23.000 | n4 1.514621 |
| r8 | ∞ | d9 | 363.838 | |
| r9 | ∞ | d10 | 100.000 | n5 1.515089 |
| r10 | ∞ | d11 | 2.000 | |
| r11 | 121.125 | d12 | 15.000 | n6 1.829396 |
| r12 | 291.152 | d13 | 34.611 | |
| r13 | −232.929 | d14 | 5.000 | n7 1.514621 |
| r14 | 57.086 | d15 | 45.997 | |
| r15 | −46.679 | d16 | 8.000 | n8 1.514621 |
| r16 | −385.756 | d17 | 27.687 | |
| r17 | −314.744 | d18 | 22.000 | n9 1.829396 |
| r18 | −91.756 | d19 | 8.830 | |
| r19 | −7037.486 | d20 | 15.000 | n10 1.829396 |
| r20 | −271.235 | d21 | 2.000 | |
| r21 | 301.053 | d22 | 15.000 | n11 1.829396 |
| r22 | 3107.757 | d23 | 108.394 | |
| r23 | 100.082 | d24 | 15.000 | n12 1.829396 |
| r24 | 143.091 | d25 | 97.308 | |
| SENSOR SURFACE | ∞ | | | |
| | | d26 | 276.822 | |

FIG. 5 shows in its lower part an illumination optical system 30 that introduces light passing through the pinhole 3 and reflected by the half mirror 4 to the measurement object aspheric surface 22. The illumination optical system 30 is constituted of a positive lens group (multiple lenses) that converts divergent light into convergent light and a negative lens that corrects aberration generated by the positive lens group. Power and thickness of each of the lenses and aerial distances therebetween are set such that the curvature radius of the illumination wavefront at the measurement object aspheric surface 22 becomes −350 mm.

FIG. 5 shows in its upper part an imaging optical system 33 that is constituted of the imaging optical system 30 and a projection optical system 31 and introduces the light reflected by the measurement object aspheric surface 22 to the sensor 8. The imaging optical system 33 has a feature that the sensor conjugate surface 32 is a spherical surface whose curvature radius is −500 mm. Therefore, provision of the negative Petzval sum to the imaging optical system 33 as described above needs to place a lens having a strong negative power.

Of the imaging optical system 33, the lenses between the half mirror 4 and the measurement object aspheric surface 22 also constitute the illumination optical system 30, and also serve as a field lens to set the position Ep of the exit pupil to −600 mm. Thus, it is difficult to place the lens having such a strong negative power between the half mirror 4 and the measurement object aspheric surface 22 in the imaging optical system 33.

Therefore, the imaging optical system 33 has power arrangement that places its pupil between the half mirror 4 and the sensor 8. This power arrangement allows symmetric placement of negative lenses on both sides of the pupil, which enables removal of comatic aberration generated by a negative lens having a strong power. Furthermore, using a glass material having a low refractive index for the negative lens and using a glass material having a high refractive index for the positive lens enables decrease of power of the negative lens.

The use of the optical system shown in FIG. 5 and Table 3 makes it possible to simultaneously measure the entire measurement object aspheric surface having the aspheric coefficients shown in Table 1. Moreover, when there are multiple measurement object aspheric surfaces to be measured by using a same optical system, the optical system may be produced using a condition that satisfies results of the calculation described in the above embodiment for all of the measurement object aspheric surfaces.

Next, description will be made of a procedure of calculation of the profile of the measurement object aspheric surface from data obtained by the measurement using the sensor 8 with reference to FIG. 6.

This embodiment using the Shack-Hartmann sensor as the sensor 8 obtains, at step S1, data of an angle distribution (hereinafter referred to as "a ray angle distribution") of rays entering the sensor 8. Next, this embodiment performs ray position conversion on the ray angle distribution at step S2 and performs ray angle conversion thereon at step S3; the ray angle distribution measured by the sensor 8 is thereby converted into a ray angle distribution on the sensor conjugate surface 25.

The ray position conversion is a process to convert positional coordinates on the sensor 8 (sensor surface) into positional coordinates on the sensor conjugate surface 25. Specifically, the ray position conversion multiplies the positional coordinates on the sensor surface by a magnification set using the magnification (paraxial magnification) M of the imaging optical system 7 and information on lateral aberration and distortion thereof (that is, with consideration of aberration of the optical system) to calculate the positional coordinates on the sensor conjugate surface 25. The ray angle conversion is a process to convert ray angles (that is, angles of rays) on the sensor surface into ray angles on the sensor conjugate surface 25. Specifically, the ray angle conversion divides the ray angles measured by the sensor 8 by an angle magnification set with consideration of aberration of the optical system to calculate the ray angles on the sensor conjugate surface 25.

Then, this embodiment performs, at step S4, ray tracing calculation from the sensor conjugate surface 25 to the measurement object aspheric surface 22 to calculate a ray angle distribution of the light (reflected light) reflected by the measurement object aspheric surface 22. Finally, this embodiment calculates, at step S5, slope of the measurement object aspheric surface 22 from the ray angle distribution of the reflected light on the measurement object aspheric surface 22 and a ray angle distribution of the illumination light and integrates the slop to calculate the profile of the measurement object aspheric surface 22.

Figure 6:
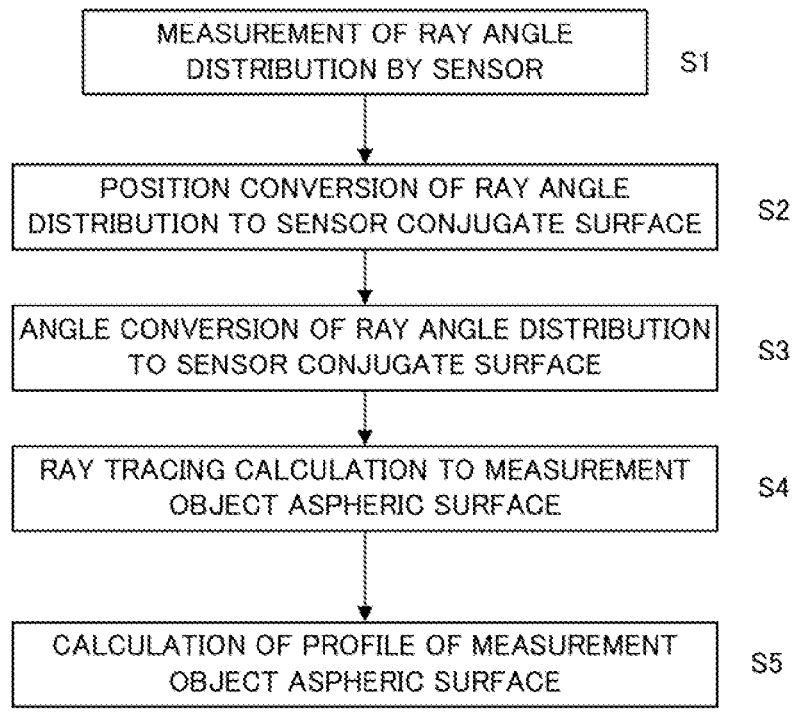
FIG. 6 shows a procedure of calculation of profile of the measurement object aspheric surface from measurement data obtained by the sensor in the measuring apparatus of Embodiment 1.

This embodiment measures a reference aspheric surface (one of measurement object aspheric surfaces) whose profile is known (that is, whose profile has been measured) and the measurement object aspheric surface whose profile is not known, and performs the calculation according to the procedure shown in FIG. 6 on data obtained by the measurement of these two aspheric surfaces. Then, this embodiment calculates a difference between the calculated surface profiles of the two aspheric surfaces to remove an error component generated due to various errors of the optical system included in the calculated profile of the measurement object aspheric surface, thereby enabling surface profile measurement with high accuracy.

Although the above embodiment used an aspheric lens as an object to be measured, other objects than the aspheric lens may be used as the object to be measured. For example, a mold for forming the lens may be used, and a measurement object aspheric surface having a concave surface may be used as mentioned above. When the measurement object aspheric surface is a concave surface, it is necessary to provide, to the imaging optical system, a Petzval sum of positive sign.

Moreover, although this embodiment described the case where the magnification M of the imaging optical system is 4, it is advantageous to use a lower magnification of the imaging optical system when a measurement object aspheric surface having a larger curvature change in its radial direction is measured.

Furthermore, when multiple measurement object aspheric surfaces are measured, a condition necessary for the optical system may be calculated by changing a distance between the sensor conjugate surface and each of the measurement object aspheric surfaces.

Embodiment 2

Figure 7:
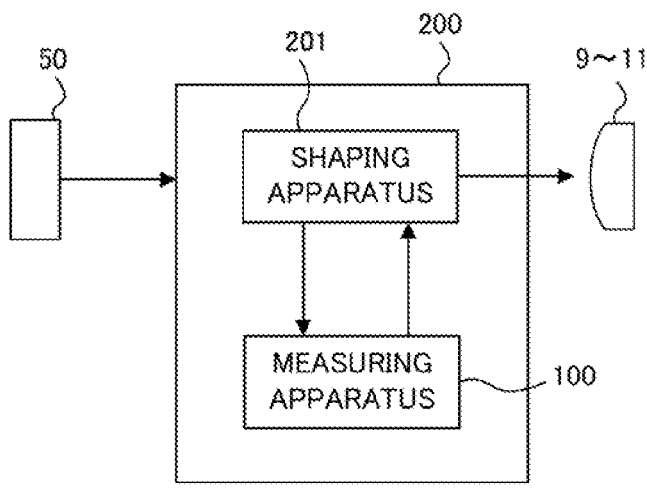
FIG. 7 schematically shows a configuration of an optical element producing apparatus that is Embodiment 2 of the present invention.

FIG. 7 shows a configuration of an optical element producing apparatus 200 including the aspheric surface measuring apparatus 100 described in Embodiment 1.

In FIG. 7, reference numeral 50 denotes a material of a measurement object lens, and reference numeral 201 denotes a shaping apparatus that performs shaping processes such as cutting and polishing to shape the measurement object lens as an optical element. The measurement object lens has any one of measurement object aspheric surfaces 9 to 11 shown in FIG. 1.

Surface profile of the measurement object surface of the measurement object lens shaped by the shaping apparatus 201 is measured by using the aspheric surface measuring method described in Embodiment 1 in the aspheric surface measuring apparatus 100. The measuring apparatus 100 calculates, in order to shape the measurement object aspheric surface into a target surface profile, a correction shaping amount for the measurement object aspheric surface based on a difference between data of the measured profile of the measurement object aspheric surface and the data of the target surface profile, and outputs it to the shaping apparatus 201. Thus, the shaping apparatus 201 performs a correction shaping process using the correction shaping amount to complete the measurement object lens having the measurement object aspheric surface whose surface profile coincides with the target surface profile.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-052423, filed on Mar. 9, 2012, which is hereby incorporated by reference herein in its entirety.

What is claimed is:

1. An aspheric surface measuring method for measuring profile of a measurement object aspheric surface using output from a light-receiving sensor, by projecting light from a light source as an illumination light that is a spherical wave onto the measurement object aspheric surface through an illumination optical system and introducing a reflected light that is the light reflected by the measurement object aspheric surface to the light-receiving sensor through an imaging optical system, the method comprising:
providing, to a wavefront of the illumination light, a curvature that brings an absolute value of an angle of the reflected light to a smaller value than a maximum value of absolute values of angles of peripheral rays on a side closer to the measurement object aspheric surface than the imaging optical system;
locating an exit pupil of the imaging optical system when defining the light-receiving sensor as an object surface at a position where the absolute value of the angle of the reflected light is smaller than the maximum value;
providing, to a sensor conjugate surface having a conjugate relationship with the light-receiving sensor provided by the optical system, a curvature and a position that cause rays of the reflected light not to intersect with one another on the sensor conjugate surface; and
setting all of the sensor conjugate surface, the wavefront of the illumination light and the measurement object aspheric surface to have a same one of convex and concave surfaces toward a same side in an optical axis direction of the illumination and imaging optical systems.

2. An aspheric surface measuring method according to claim 1, wherein the measurement object aspheric surface is the convex surface, and the imaging optical system has a Petzval sum of negative sign.

3. An aspheric surface measuring method according to claim 1, wherein the measurement object aspheric surface is the concave surface, and the imaging optical system has a Petzval sum of positive sign.

4. An aspheric surface measuring method according to claim 1, wherein the method further comprising:
measuring a ray angle distribution of the reflected light by using the light-receiving sensor;
converting the ray angle distribution measured by the light receiving sensor into a ray angle distribution on the measurement object aspheric surface by ray position conversion, ray angle conversion and ray tracing calculation; and
calculating the profile of the measurement object aspheric surface from the ray angle distribution on the measurement object aspheric surface.

5. An aspheric surface measuring apparatus configured to measure profile of a measurement object aspheric surface, the apparatus comprising:
a light-receiving sensor;
an illumination optical system configured to project light from a light source as an illumination light that is a spherical wave onto the measurement object aspheric surface; and
an imaging optical system configured to introduce a reflected light that is the light reflected by the measurement object aspheric surface to the light-receiving sensor,
wherein the apparatus is configured to:
provide, to a wavefront of the illumination light, a curvature that brings an absolute value of an angle of the reflected light to a smaller value than a maximum value of absolute values of angles of peripheral rays on a side closer to the measurement object aspheric surface than the imaging optical system;
locate an exit pupil of the imaging optical system when defining the light-receiving sensor as an object surface at a position where the absolute value of the angle of the reflected light is smaller than the maximum value; and
provide, to a sensor conjugate surface having a conjugate relationship with the light-receiving sensor provided by the optical system, a curvature and a position that cause rays of the reflected light not to intersect with one another on the sensor conjugate surface,
wherein all of the sensor conjugate surface, the wavefront of the illumination light and the measurement object aspheric surface are set to have a same one of convex and concave surfaces toward a same side in an optical axis direction of the illumination and imaging optical systems.

6. An optical element producing apparatus comprising:
a shaping apparatus configured to shape an optical element; and
a measuring apparatus configured to measure profile of a measurement object aspheric surface of the optical element by an aspheric surface measuring method using output from a light-receiving sensor, by projecting light from a light source as an illumination light that is a spherical wave onto the measurement object aspheric surface through an illumination optical system and introducing a reflected light that is the light reflected by the measurement object aspheric surface to the light-receiving sensor through an imaging optical system, the method comprising:
providing, to a wavefront of the illumination light, a curvature that brings an absolute value of an angle of the reflected light to a smaller value than a maximum value of absolute values of angles of peripheral rays on a side closer to the measurement object aspheric surface than the imaging optical system;
locating an exit pupil of the imaging optical system when defining the light-receiving sensor as an object surface at a position where the absolute value of the angle of the reflected light is smaller than the maximum value;
providing, to a sensor conjugate surface having a conjugate relationship with the light-receiving sensor provided by the optical system, a curvature and a position that cause rays of the reflected light not to intersect with one another on the sensor conjugate surface; and setting all of the sensor conjugate surface, the wavefront of the illumination light and the measurement object aspheric surface to have a same one of convex and concave surfaces toward a same side in an optical axis direction of the illumination and imaging optical systems.

7. An optical element comprising:

a body of the optical element; and an aspheric surface formed on the body, wherein the optical element is produced by using the optical element producing apparatus according to claim 6.

\* \* \* \* \*